United States Patent Office 3,024,282
Patented Mar. 6, 1962

3,024,282
PROCESS FOR THE AMIDOMETHYLATION OF AROMATIC COMPOUNDS
Chester L. Parris, Pittsburgh, Pa., assignor to Pittsburgh Plate Glass Company, a corporation of Pennsylvania
No Drawing. Filed Oct. 29, 1957, Ser. No. 693,034
6 Claims. (Cl. 260—562)

This invention relates to amides involving the structure:

$$Ar-(CH_2-X)_n$$

wherein the group Ar is an aromatic radical containing a benzene or naphthalene ring, preferably with 1 to 5 methyl groups substituted for hydrogen of the ring. The group or groups $$-(CH_2-X)$$

are directly joined to ring carbon atoms, X is a radical derived by removing an amido hydrogen atom from an amide, and $n$ is a whole number from 1 to 4. The invention has particular relation to a method of forming said amides.

It has heretofore been suggested to prepare amides by the reaction of a secondary olefinic hydrocarbon such as isobutene with a nitrile such as acetonitrile in the presence of sulfuric acid. This reaction is believed to proceed substantially as follows:

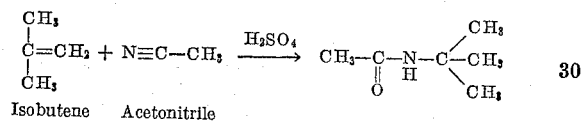

Isobutene   Acetonitrile

The reaction depicted above is disclosed in a publication by John J. Ritter et al. in the Journal of the American Chemical Society, volume 70, No. 12, page 4045, December 1948. According to this publication, the nitrile in this reaction cannot successfully be replaced by the corresponding amide, e.g., acetamide.

It has now been discovered, however, that if the hydrocarbon employed is aromatic, including 1 or more available hydrogens attached to ring carbon atoms, and if the starting amide employed in the reaction of amidification comprises a methylene group attached to the nitrogen of the amide to provide the moiety:

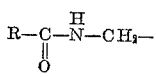

wherein R is hydrogen, or a monovalent organic radical, direct amidification can readily be obtained between the two to provide amides of the structure:

$$Ar-(CH_2-X)_n$$

wherein Ar, X and $n$ have the significance previously set forth:

These compounds may also be depicted structurally as follows:

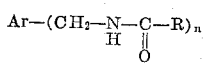

wherein R is hydrogen or a monovalent organic radical, and Ar and $n$ have the significance set forth above.

This reaction between the aromatic compounds and the N-substituted amides is quite surprising and could not reasonably be anticipated, inasmuch as the unsaturation in the starting hydrocarbon which is subjected to amidification is benzenoid rather than ethylenic.

The Aromatic Hydrocarbon Component

In conducting the reaction involved in the present invention, the aromatic compound $Ar_1$, which is reacted with the amide may be an unsaturated aromatic ring compound such as benzene, naphthalene or anthracene, but preferably it possesses 1 or more substituent alkyl groups, such as methyl or ethyl groups; or alkoxy groups such as methoxy or ethoxy groups. Hydrocarbons of the benzene or benzenoid series including 1 or more methyl groups as side chains are particularly preferred. Examples of these compounds include toluene, xylene in its various isomeric forms, durene, isodurene, mesitylene, pseudocumene, and others. The side chains, if present, may number from 1 to 5 and preferably are from 2 to 4. The aromatic hydrocarbon should include ring hydrogens at least equal to $n$ in number.

The Amide Component

The amide which is reacted with the aromatic hydrocarbon is of the general formula:

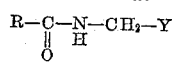

R in the foregoing structure is of broad significance, being represented, for example, by such groups as the following:

H—
CH₃—
CH₃CH₂—
H₂N—
HOCH₂CH₂—
C₂H₅O—COCH₂—
C₆H₅—
C₆H₅CH₂— n—C₇H₁₅—
n—C₉H₁₉—
n—C₁₁H₂₃—
n—C₁₃H₂₇—
n—C₁₇H₂₆—
CH₂=CH—
CH₂=CH—CH₂—
CH₂CH=CH—

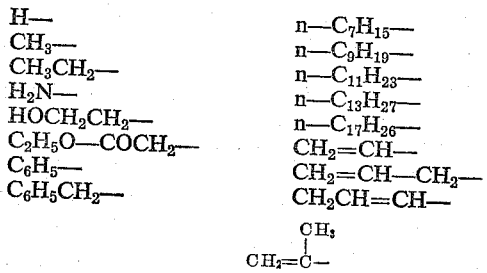

It will be apparent from the foregoing that R can be hydrogen or any organic radical; preferably, however, R is a hydrocarbon radical, a radical composed of carbon, hydrogen, and oxygen atoms, or a radical composed of carbon, hydrogen, oxygen and nitrogen atoms.

Y in the starting amide is a polar group, that is, a group whose free valence is on an atom other than a carbon atom; such groups are represented, for example, by the following:

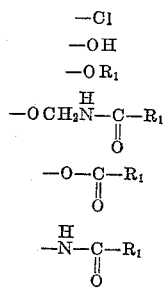

wherein $R_1$ may be the same as or different from R.

The starting amide compound may be formed by heating (A) an amide such as acetamide, acrylamide, butyramide, or the like containing active hydrogen with (B) a methylene supplying agent such as paraformaldehyde. Sometimes a third component, for example, an alcohol, acetic anhydride, hydrochloric acid, or the like, is included. The reaction may be conducted in the presence of a solvent such as toluene or other aromatic hydrocarbon if desired. Other methods of preparing the amides containing a reactive methylene group may also be employed.

The reaction between the hydrocarbon and the amide containing a reactive methylene group may be represented by the following equation:

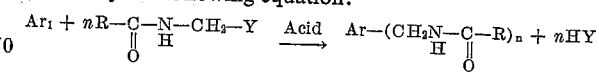

In those instances in which the group Y is hydroxyl, it will be apparent that water is evolved by the reaction and is taken up in the acid employed to promote the reaction and which preferably has dehydrating properties.

If Y is alkoxy, an alcohol is formed as a by-product, and where Y is halogen, the by-product in the reaction is a hydrogen halide.

If Y in the amide reactant is a moiety of the formula:

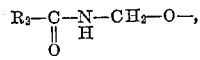

as in the compounds of the general formula:

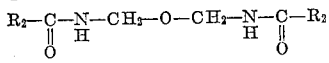

where groups $R_2$ are methyl, ethyl, allyl, or the like, two moieties each of the formula:

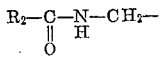

may be liberated in the nascent state by splitting of the amide reactant and water is formed by reaction of the oxygen atom with the hydrogen split from the aromatic rings. Both of these moieties can replace ring hydrogen atoms in the aromatic hydrocarbon component.

The compounds acting as catalysts or promoters of the reaction include the so-called Lewis acids such as zinc chloride, aluminum chloride, boron trichloride etherate, and acids such as phosphoric acid, polyphosphoric acid, sulfuric acid, alkanesulfonic acids such as toluenesulfonic acid, and the like. Some of these, as for example, sulfuric acid and zinc chloride, preferably are employed in an anhydrous solvent or diluent such as an anhydrous carboxylic acid and more particularly glacial acetic acid. The acid is generally employed in a ratio of about 20 percent to 80 percent by weight based upon the total reactants (including the catalyst as a reactant), although larger or smaller amounts may be utilized if desired.

The catalyst, since it is a relatively strong acid, may form a salt with the amide product, but this can readily be hydrolyzed as hereinafter described, thus giving the free amide.

Water in the free state, if present in the reaction system at all, should be limited in amount and may be and often is, entirely absent. If present in excessive amount, it tends to produce hydrolyzing conditions in the system that do not favor the reaction of the starting aromatic hydrocarbon and the amide to form amides in which the amide group is bridged to the aromatic nucleus of the hydrocarbon component by a methylene group. Water, if present, should not exceed 20 percent by weight of the catalyst or promoter mixture.

As indicated by the reaction equation set forth hereinabove, one or more groups of the structure

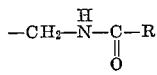

attach to the nucleus of the aromatic hydrocarbon, depending on the hydrocarbon and the amide employed, as well as on the ratio of reactants. It may be stated that in general it is preferred to utilize about one mole each of the amide and the methylating agent for each group of the structure

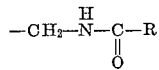

it is desired to introduce into the aromatic compound. However, it is also possible to use other proportions, for example, from about 1 to 10 moles or more of each reactant per mole of the other reactants.

The temperature of reaction may vary over a relatively broad range, for example, from about 25° C. to about 130° C., depending upon the speed with which it is desired to effect the reaction. At lower temperatures, the reaction proceeds slowly and may require a number of days to reach a satisfactory degree of completion. At higher temperatures, especially if excessive amounts of free water are present in the reaction mixture, there may be a tendency to hydrolyze or otherwise to retard formation of the product. Some heat (exothermal or applied) is preferred to speed the reaction, but the latter should not be conducted at such high temperature as to produce charring or decomposition of the reactants or of the reaction product.

In most instances, the temperature rises exothermically when the hydrocarbon and the amide are mixed, and the application of external heat is not usually required except at the initial stages of the reaction. However, the desired temperature may also be attained and kept either by application of external heat, or by cooling as particular conditions may require. The reaction is usually completed in a period of about 30 minutes to 60 hours, dependent upon the temperature at which the reaction is conducted.

As a result of the reaction, salts of the amidomethyl aromatic compounds and the acid employed to promote the reaction may be formed. These salts are readily hydrolyzed even by washing, or by otherwise treating the reaction product with water at room temperature. The liberated acids may thus be washed from the product, leaving the free amides of the aforementioned structure:

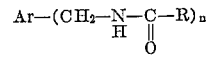

Assuming that these amides are to be recovered as such at the conclusion of the reaction, the salt product may be purified and simultaneously the free amide may be liberated by washing out the water soluble components including excess catalyst by application of aqueous ammonia. The washed amide product may be dried. The amide may also be further purified by appropriate techniques as for example, by crystallization from a solvent medium.

Amides prepared in accordance with the foregoing method or methods, are useful for various purposes. For example, some of them may be used in pharmaceutical products. Others may be homopolymerized to form useful resins. The latter reaction particularly applies to those containing an acrylic group or other terminal $>C=CH_2$ groups as a portion of radical R.

As indicated hereinabove, the amides can also be hydrolyzed to amines. The latter are useful for various purposes, as for example, in the reaction with dicarboxylic acids such as sebacic acid or adipic acid to form thermoplastic polyamide resins. These are characterized by relatively high melting points. Such resins may be spun into filaments such as are used in fabrics and in yarns, cordage or in other articles. Likewise, the amines may be employed as hardening agents in place of conventional amines employed in the curing of epoxy resins.

The amines, such as the diamines so prepared may also be reacted with hydrochloric acid to form salts which in turn can be treated with phosgene to form the corresponding isocyanates, or more particularly the diisocyanates. These diisocyanates are adapted to react with compounds containing active hydrogen as represented by hydroxyl groups, to form polyurethanes. Thus, they may be reacted with polyhydric alcohols such as castor oil, or mixtures thereof with polyols to form valuable resins.

They may also be reacted with saturated polyesters containing active hydroxyls. For example, they may be reacted with polyesters of polyols and saturated dicarboxylic acids, said polyesters being of hydroxyl values in the range of 40 to 600. The resultant products are polyurethane resins of the thermoset type, having good durability and resistance to solvents, acids and other media. Polyesters suitable for reaction with the isocyanates are represented by those of dicarboxylic acids free of reactive non-benzenoid carbon to carbon unsaturation, such as adipic acid or phthalic acid, with polyhydric alcohols such as ethylene glycol, diethylene glycol, bis(hydroxymethyl)-m-xylenes, and others, or mixtures of such dihydric alcohols with alcohols containing three or more hydroxyl groups and being represented by glycerol, pentaerythritol or the like.

The anhydrous mixtures of the diisocyanates and the polyhydric compounds may be used to provide coatings for purposes of decoration or protection upon the surfaces of metal, wood, concrete, stone or the like materials.

If water is added to the mixtures, carbon dioxide is liberated and they may be employed in the formation of useful thermoset polyurethane foams such as are employed for thermal insulation, for cushioning, or other purposes.

Diisocyanates prepared in the foregoing manner are superior to conventional diisocyanates such as tolylene diisocyanates inasmuch as they possess but little or no odor. Furthermore, they react with polyesters quite rapidly, and films formed from mixtures of the polyesters and the diisocyanates are characterized by relatively low "crawl" tendencies. This is of obvious advantage in the coating art.

The application of the principles of the invention for the preparation of amidomethylated aromatic compounds of the formula:

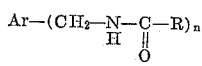

is illustrated by the following examples:

Example I

In this reaction, the hydrocarbon component is m-xylene and the amide is N-methylol acrylamide. The starting N-methylol acrylamide may be readily prepared by reacting acrylamide with formaldehyde, paraformaldehyde, and the like, as for example, by the method described by Feuer and Lynch, Journal of the American Chemical Society, 75, 5027 (1953). The starting N-methylol acrylamide and m-xylene are combined in the following reaction mixture:

| | |
|---|---|
| m-Xylene _____ grams__ | 15.9 |
| N-Methylol acrylamide_____ do____ | 35.0 |
| Phosphoric acid (85 percent) _____ milliliters__ | 100.0 |

The N-methylol acrylamide is employed in a ratio of about 2 moles per mole of m-xylene.

The mixture is maintained at a temperature within a range of 65° C. to 70° C. until the spontaneous exotherm is spent. The mixture is then heated at 85° C. to 90° C. for 4 hours and is cooled and poured slowly with vigorous stirring into cold water.

The product is filtered, washed and dried. A yield of 76 percent by weight (31 gram) of crude 4,6-bis(acrylamidomethyl)-m-xylene is obtained. The compound polymerizes at temperatures above about 200° C. to form a resin.

In this example, m-xylene may be replaced by the corresponding molecular proportion of toluene or benzene, or it can also be replaced with durene, isodurene, or mesitylene or other aromatic compound containing 1 to 4 methyl or ethyl groups, or alkoxy groups.

Example II

In this example, the N-methylol acrylamide of Example I is replaced by a molecularly equivalent amount of N-methylol acetamide. The latter compound is readily prepared by the method of Chwala, as described in Monatsh; 78, 172 (1948). The techniques are in other respects substantially the same as those employed in Example I. The product is 4,6-bis(acetamidomethyl)-m-xylene of the formula:

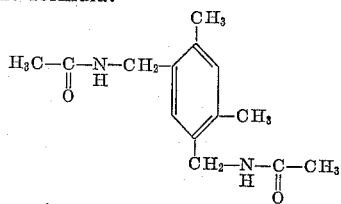

The product melts at 252° C.–256° C.

Example III

In this example, N,N'-methylene bisacetamide of the formula:

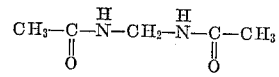

is employed as the amidomethylating reagent. This compound is prepared conveniently by heating a mixture consisting of two molecular proportions of acetamide and one molecular proportion of paraformaldehyde to about 130° C. in the presence of an inert diluent such as xylene, while the water formed in the reaction is continuously removed by distillation. After the reaction is complete, the reaction mass is cooled, whereupon a mass of crystals is formed. These, after recrystallization from methanol, had a melting point of 197° C. to 198° C. The theoretical nitrogen content of this compound is 21.52 percent; the content as determined by analysis is 21.42 percent.

To a cooled mixture of 22.5 milliliters of sulfuric acid in 105 milliliters of glacial acetic acid was added 71.5 grams of the above N,N'-methylene bisacetamide and 26.5 grams m-xylene. The mixture was heated at 90° C. for 5½ hours, and was then poured into dilute ammonium hydroxide solution. The resulting crude solid was filtered and recrystallized from hot benzene after which the melting point was 113° C.–113.5° C. This compound was identical with an authentic specimen of N-(2,4-dimethylbenzyl)acetamide.

In place of N,N'-methylene bisacetamide one may employ N,N'-methylene bisacrylamide of the formula:

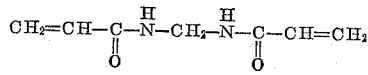

which is conveniently prepared by the method of Magat et al., Journal of the American Chemical Society, 73, pages 1028 et seq., (1951).

Example IV

In accordance with this example, dimethylolurea is intermixed with a molecularly equivalent amount of an aromatic hydrocarbon, namely m-xylene. In the reaction, concentrated phosphoric acid or polyphosphoric acid is employed to promote the reaction.

Example V

In this example the use of diacetamidomethyl ether of the formula:

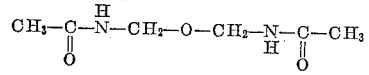

is illustrated. Diacetamidomethyl ether has been prepared by the inventor (apparently for the first time) by the following procedure:

The reaction mixture comprising—

| | |
|---|---|
| Acetamide _____ grams__ | 413 |
| Paraformaldehyde _____ do____ | 360 |
| Xylene _____ milliliters__ | 1,000 | is refluxed with vigorous stirring in a flask equipped with a trap for separating the water formed in the reaction. After 121 milliliters of water is collected, the reaction product is chilled. The resulting crystalline mass is filtered and recrystallized from hot dioxane after which, the melting point is 97° C.–98.5° C. The theoretical composition is:

| | Percent |
|---|---|
| Carbon | 44.99 |
| Hydrogen | 7.55 |
| Nitrogen | 17.50 |

The found composition is:

| | Percent |
|---|---|
| Carbon | 45.03 to 45.08 |
| Hydrogen | 7.47 to 7.82 |
| Nitrogen | 17.60 to 17.73 |

To a mixture of 17 milliliters sulfuric acid in 78 milliliters acetic acid are added 19.6 grams m-xylene and 65 grams diacetamidomethyl ether. The mixture is heated slowly to 90° C. and maintained at the temperature for 5½ hours, after which it is cooled and poured into dilute ammonium hydroxide. The resulting solid, after filtration and recrystallization from methanol, melts at 250° C.–252° C. and is identical with the product of Example II.

*Example VI*

In this example, the use of N-methoxymethyl acetamide (Chwala, Monatsh, 78, 172 (1948)) is illustrated.

To a cold mixture of 22.5 milliliters of sulfuric acid in 175 milliliters acetic acid is added 41.2 grams methoxymethyl acetamide while the temperature is maintained below 35° C. Twenty-one and two-tenths (21.2) grams of m-xylene is then added and the mixture is heated for 5 hours at 90° C. After cooling, the mixture is poured into dilute ammonium hydroxide solution and the resulting white solid is filtered, washed and dried. After recrystallization from methanol the melting point is 252° C.–256° C. Mixed melting point determination and infrared spectrum analysis show the material to be identical with the product of Example II.

*Example VII*

In this example, the use of N-acetoxymethyl acetamide is illustrated. This compound is prepared in the following manner:

A mixture of 118 grams of acetamide and 66 grams of paraformaldehyde is treated with 3 milliliters of a 40 percent aqueous potassium hydroxide solution. After heating at 60° C. for about 15 minutes, the resulting clear liquid is poured into a mixture of 500 milliliters of acetic acid in 500 milliliters acetic anhydride. The mixture is then heated for 15 hours in a steam bath, and distilled in vacuo. The excess acetic acid and acetic anhydride are recovered and the product is distilled as a colorless oil of boiling point 117° C.–125° C. at 8 millimeters and a refractive index of 1.4451. The theoretical nitrogen content is 10.69 percent. The value determined by analysis is 10.75 percent.

The reaction of the foregoing material with m-xylene is conducted as follows:

To a cold mixture of 22.5 milliliters of sulfuric acid in 175 milliliters of acetic acid is added 52.5 grams of the N-acetoxymethyl acetamide at 35° C.–40° C. twenty-one and two-tenths (21.2) grams of m-xylene is added and the mixture is heated for 4 hours at 85° C.–90° C. The reaction mixture is poured into dilute ammonium hydroxide and the flocculent white solid formed is filtered, washed and dried. The solid after recrystallization from methanol, had a melting point of 252° C.–255° C. and is identical with the product of Example II.

*Example VIII*

In this example the use of N-chloromethyl acetamide to amidate xylene is illustrated.

N-chloromethyl acetamide is prepared according to the method discussed in U.S. Patent No. 2,399,603. A mixture comprising 71 grams acetamide, 30 grams paraformaldehyde, and 2 grams of sodium sulfate in 100 milliliters dioxane is treated with a stream of hydrogen chloride gas at 60° C.–70° C. for 2 hours. A stream of inert gas is then passed through the mixture until excess HCl gas is removed.

Then 106 grams m-xylene and 25 grams fused anhydrous zinc chloride are added to the N-chloromethyl acetamide thus prepared. The mixture is refluxed 3 hours until evolution of HCl is complete and the mixture is poured into dilute ammonium hydroxide. The resulting solid is recrystallized from alcohol, after which the melting point is 110° C.–112° C. The product is N-(2,4-dimethylbenzyl)acetamide identical with the product of Example III.

The theoretical nitrogen content is 7.91 percent and the analytically determined value is 8.08 percent.

*Example IX*

This example illustrates the hydrolysis of 4,6-bis(acetamidomethyl)-m-xylene of the formula:

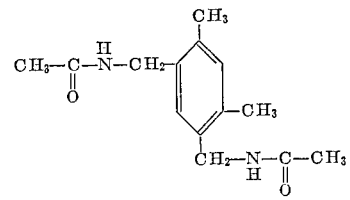

to form the corresponding 4,6-bis(aminomethyl)-m-xylene. An appropriate reaction mixture comprises:

| | |
|---|---|
| 4,6-bis(acetamidomethyl)-m-xylene | grams__ 496 |
| Concentrated sulfuric acid | milliliters__ 250 |
| Water | do____ 2500 |

This mixture is refluxed with vigorous agitation for 33.5 hours and is cooled. The cooled mixture is further treated with 500 milliliters of benzene and the mixture is filtered and the benzene layer, together with the solid residue (35 grams) is discarded.

The aqueous layer is made alkaline with 450 grams of cold sodium hydroxide in 1 liter of water. The solution is further diluted with water to a total volume of 5 liters after which it is extracted continuously with benzene for 5 hours and then with butanol for 44 hours. The combined extracts are concentrated and the crystalline residue is slurried with an aromatic petroleum hydrocarbon solvent. The slurry is filtered and the product is recrystallized from ethanol to obtain 4,6-bis(aminomethyl)-m-xylene having a melting point of 129° C. to 130° C. This material can be reacted with dibasic acids such as adipic acid or sebacic acid to provide thermoplastic polyamide resins having higher melting points than the polyamides now commercially available. Hydrochloride salts thereof can be reacted with phosgene to form 4,6-bis(isocyanatomethyl)-m-xylene.

The following example illustrates the conversion of 4,6-bis(aminomethyl-m-xylene into the corresponding 4,6-bis(isocyanatomethyl)-m-xylene.

*Example X*

In accordance with this example, 4,6-bis(aminomethyl)-m-xylene prepared in accordance with the provisions of the preceding example is reacted with hydrochloric acid to provide the corresponding hydrochloride salt which has a melting point of about 305° C. to 310° C.

This salt is suspended in tetralin (as a non-reactive solvent) in a ratio of 59.3 grams of the salt to 500 milliliters of tetralin. The mixture is treated with a stream of chlorine-free phosgene at a temperature of 200° C. to 205° C. for a period of about 5 to 7 hours or until the evolution of hydrogen chloride is complete and none of the dihydrochloride remains in suspension.

The resultant dark solution is cooled, filtered through diatomaceous earth and the solution is distilled until excess solvent is removed. The residue is distilled under vacuum to obtain 36 grams to 38 grams of colorless oil constituting a yield of 69 percent to 70 percent by weight of a product which is primarily the corresponding 4,6-bis(isocyanatomethyl)-m-xylene. The latter is adapted to enter into substantially the same reactions as conventional tolylene diisocyanates. It will, for example, react with castor oil and with polyesters of adipic acid and polyhydric alcohols such a diethylene glycol and glycerol, or mixtures of the two, to form polyurethane resins. The latter may be employed as coatings or as foams as may be desired. The 4,6-bis(isocyanatomethyl)-m-xylene possesses a substantial advantage over conventional tolylene diisocyanate, inasmuch as it possesses but little or no odor

I claim:
1. A method of preparing a compound of the structure

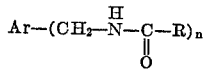

wherein Ar is a member of the class consisting of unsubstituted aromatic hydrocarbon radicals, lower alkyl substituted aromatic hydrocarbon radicals, and lower alkoxy substituted aromatic hydrocarbon radicals, R is a member of the class consisting of methyl and vinyl radicals, and $n$ is a whole number from 1 to 4, which comprises bringing together in the presence of a mineral acid catalyst and at a temperature in the range of about 25° C. to about 130° C., a member of the class consisting of unsubstituted aromatic hydrocarbons, lower alkyl substituted aromatic hydrocarbons, and lower alkoxy substituted aromatic hydrocarbons, each of said hydrocarbons having at least one available hydrogen atom in the aromatic nucleus, with an amide having the structure

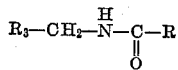

wherein $R_3$ is selected from the class consisting of

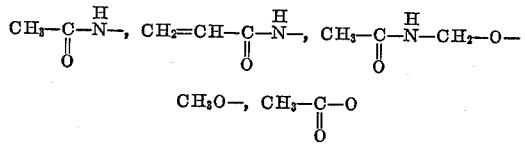

and —Cl radicals, and R has the significance set forth hereinabove.
2. The method of claim 1 wherein the reactants are m-xylene and N,N'-methylene bisacetamide.
3. The method of claim 1 wherein the reactants are m-xylene and diacetoamidomethyl ether.
4. The method of claim 1 wherein the reactants are m-xylene and N-methoxymethyl acetamide.
5. The method of claim 1 wherein the reactants are m-xylene and N-chloromethyl acetamide.
6. The method of claim 1 wherein the reactants are m-xylene and N,N'-methylene bisacrylamide.

References Cited in the file of this patent

UNITED STATES PATENTS

| | | |
|---|---|---|
| 1,503,631 | Bradner et al. | Aug. 5, 1924 |
| 2,263,013 | Scott | Nov. 18, 1941 |
| 2,312,896 | Graenacher et al. | Mar. 2, 1943 |
| 2,340,528 | Haack | Feb. 14, 1944 |
| 2,710,299 | Kottler | June 7, 1955 |
| 2,761,868 | Lacey | Sept. 4, 1956 |

FOREIGN PATENTS

| | | |
|---|---|---|
| 55,399 | Austria | Sept. 10, 1912 |
| 156,398 | Germany | Mar. 28, 1904 |
| 222,453 | Switzerland | Oct. 18, 1942 |

OTHER REFERENCES

Einhorn et al.: Annalen der Chemie, vol. 361 (1908), page 163.
Houben: Methoden der Org., Chemie, vol. 11, part I (1957), pages 795, 800–805.
Houben: Method der Organischen Chemie, vol. II, part I, page 796–797 (1957).
Jacobs et al.: Jr. Biol. Chem., vol. 20, page 688 (1915).
Snyder et al.: J.A.C.S., vol. 71 (1949), pages 1058–1060.

UNITED STATES PATENT OFFICE
CERTIFICATE OF CORRECTION

Patent No. 3,024,282                     March 6, 1962

Chester L. Parris

It is hereby certified that error appears in the above numbered patent requiring correction and that the said Letters Patent should read as corrected below.

Column 4, lines 34 and 35, for "tcehniques" read -- techniques --; column 8, line 35, for "ethanol" read -- methanol --; line 44, for "4,6-bis(aminomethyl-m-" read -- 4,6-bis(aminomethyl)-m- --; same column 8, line 70, for "a" read -- as --; column 10, line 26, for "Oct. 18, 1942" read -- Oct. 16, 1942 --.

Signed and sealed this 27th day of November 1962.

(SEAL)
Attest:
ESTON G. JOHNSON
Attesting Officer

DAVID L. LADD
Commissioner of Patents